United States Patent [19]

Stuart

[11] 4,100,994
[45] Jul. 18, 1978

[54] MARINE EXHAUST SILENCER

[75] Inventor: Robert B. Stuart, Penn Yan, N.Y.

[73] Assignee: Penn Yan Boats, Incorporated, Penn Yan, N.Y.

[21] Appl. No.: 705,683

[22] Filed: Jul. 15, 1976

[51] Int. Cl.² .............................................. F01N 3/04
[52] U.S. Cl. .................................... 181/261; 181/263; 181/264; 181/281
[58] Field of Search ................... 181/43, 39, 51, 36 C, 181/52, 33 HC, 36 D, 69, 211, 221, 260, 261, 262, 263, 269, 281, 282

[56] References Cited

U.S. PATENT DOCUMENTS

| 2,484,816 | 10/1949 | Culbert | 181/52 |
| 2,485,555 | 10/1949 | Bester | 181/52 |
| 3,198,162 | 8/1965 | Larsen | 181/39 |

Primary Examiner—L. T. Hix
Assistant Examiner—Benjamin R. Fuller
Attorney, Agent, or Firm—Stonebraker, Shepard & Stephens

[57] ABSTRACT

A silencer quiets the exhaust output from a marine engine by injecting a spray of cooling water into the exhaust passageway to mix with and cool the exhaust gases before output from the passageway. The exhaust passageway preferably enlarges substantially in cross-sectional area in the region where the mixing occurs between the injected water and the exhaust gases for enhancing the cooling effect. An inlet scoop receives water as the boat moves forward, and the water is forced through a line and into the exhaust passageway in a way that breaks the water into drops for contacting and cooling the exhaust gases. A mute that is preferably conical in shape and centered in the exhaust outlet also cooperates to reduce the exhaust noise.

8 Claims, 1 Drawing Figure

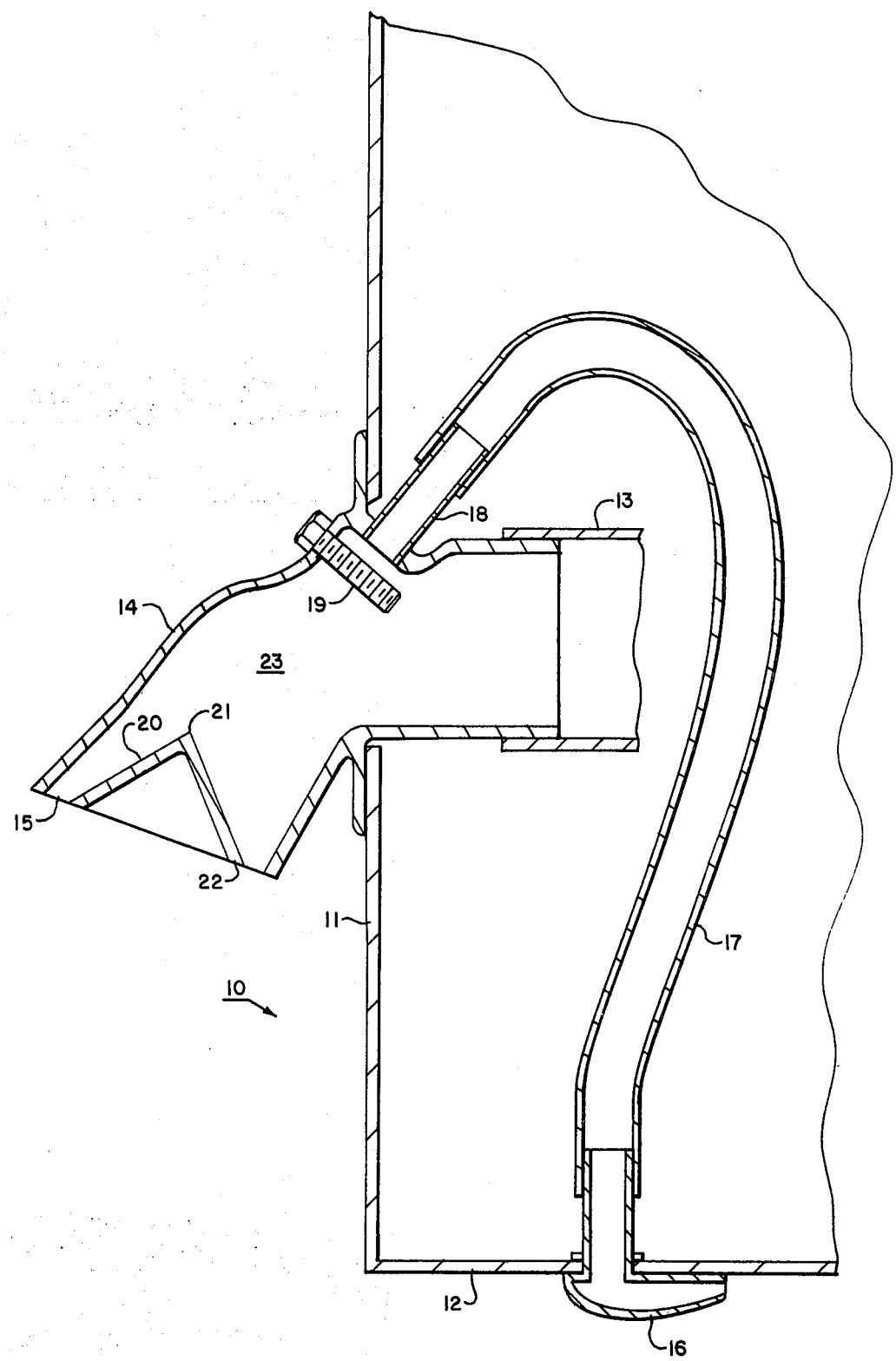

MARINE EXHAUST SILENCER

BACKGROUND OF THE INVENTION

Marine exhaust systems for boats have been troublesomely noisy for years, in spite of many attempts at muffling or quieting. Part of the problem is the harshness of the marine environment where the exhaust system must process a high rate of exhaust flow and also withstand moisture and be made of materials that will endure in a boat.

The invention resulted after many unsuccessful experiments with exhaust quieting alternatives and involves recognition of a simple and effective way for substantially quieting a marine exhaust. The invention also aims at economy, reliability, durability, effectiveness, and ease of maintenance for a marine exhaust quieting system.

SUMMARY OF THE INVENTION

The inventive silencer quiets the exhaust output from the output end of an exhaust passageway for a marine engine for a boat. It includes an inlet for receiving water from a body of water supporting the boat, and means for injecting the water from the inlet directly into the exhaust passageway. The injected water is divided into particles and mixed with exhaust gases in the passageway for cooling and quieting the engine exhaust before output from the passageway. The mixing of the exhaust gases and the cooling water particles preferably occurs in a region where the exhaust passageway is enlarged in cross-sectional area for expanding the exhaust gases to facilitate their cooling. Preferably, a generally conical mute is mounted in the output end of the exhaust passageway with the apex of the mute extending into the exhaust passageway and the conical body of the mute generally centered in the exhaust passageway and having a maximum diameter less than the inside diameter of the output end of the exhaust passageway.

DRAWINGS

The drawing shows a fragmentary, longitudinal, cross-sectional view of a boat having one preferred embodiment of the inventive exhaust silencer.

DETAILED DESCRIPTION

The drawing shows the inventive exhaust silencer as applied to a boat having an inboard engine, and the invention can be applied not only to conventional inboard drives, inboard drives using a tunnel, and inboard/outboard drives, but also to outboard drives, and the illustrated embodiment of the invention is selected for convenience only. The invention can also be applied to a wide variety of marine exhaust systems for boats, most of which usually exhaust engine cooling water along with engine exhaust gases through an exhaust passageway to an output near the surface of the water supporting the boat. Once the principles of the invention are understood, workers skilled in the art will understand how to apply the invention to most marine exhaust systems in addition to exhaust systems of the type illustrated.

A lower stern fragment of a boat 10 is shown in the drawing as having a transom 11 and a bottom 12. A conventional exhaust pipe 13 conducts exhaust gases and cooling water from the boat engine aft toward transom 11, and pipe 13 connects to a preferably cast bronze exhaust duct 14 secured to transom 11 in a generally known way.

A scoop 16 is preferably arranged at the bottom 12 of boat 10 for receiving or picking up water from the body of water supporting boat 10. Scoop 16 is generally known and is sometimes called a "clam shell" scoop oriented with a forward opening to scoop up water as boat 10 moves forward. Scoop 16 can be located in other underwater regions of boat 10, or can be arranged on the underwater portion of an outboard motor drive.

A water injection line 17 extends upward from scoop 16 and connects to an injector tube 18 for directing a stream of cooling water directly into exhaust duct 14. A stud 19 is threaded into exhaust duct 14 to extend inward across the stream of water emerging from injector tube 18 to break the water stream up into a spray of water particles for contacting and cooling the hot gases in the exhaust passing through duct 14. Nozzles and other spray-making and mixing or contacting devices can be substituted for stud 19, and instead of a separate threaded stud 19, duct 14 can have a fixed projection formed to extend across the water stream from injector pipe 18. Regardless of the particular expedient used, it is preferred according to the invention to break the cooling water stream into drops or particles that spray throughout the exhaust passageway for intimate mixing or contacting with the exhaust gases, primarily to cool the exhaust gases. The cooling accomplished by the inventive water injection into the exhaust passageway substantially reduces the noise otherwise created by the exhaust gases as they escape from the output end 15 of the exhaust passageway. This cooling effect is in addition to any cooling that is conventionally accomplished by exhausting engine cooling water along with engine exhaust gases.

Exhaust duct 14 also allows exhaust gases from pipe 13 to expand substantially in expansion region 23 where the cross-sectional area of exhaust duct 14 is substantially larger than the cross-sectional area of exhaust pipe 13. Expansion area 23 is also preferably in the area where water particles are mixed with the exhaust gases so that cooling is accomplished not only by the mixing with water particles, but also by expansion of the exhaust gases in lower-pressure region 23. The combined effect of the exhaust gas expansion, pressure reduction, and water injection cooling substantially lowers the exhaust gas temperatures in region 23 and quiets the exhaust that is output from output end 15 of duct 14.

The inventive system for cooling exhaust gases preferably injects the cooling water and expands the exhaust gases near the output end of the exhaust passageway, but the cooling liquid can be injected into the exhaust passageway at any convenient location downstream from the exhaust manifold of the engine. Also, instead of a scoop 16 and an injection line 17 for forcing the cooling water into the exhaust passageway as a function of the speed of boat 10 through the water, a pump or other device can be used to inject cooling water into the exhaust passageway. Experience has shown that the greater the cooling of exhaust gases, the quieter the exhaust output becomes.

The inventive exhaust system also preferably includes a mute 20 formed as a generally conical element arranged just inside the output end 15 of the exhaust duct 14 as illustrated. The apex 21 of the conical element 20 is oriented to extend inward from the output end 15, and conical element 20 is preferably centered in output end 15. The maximum diameter of conical element 20 across its trailing edge 22 is preferably substantially less than the inside diameter of output end 15. Sufficient annular space is allowed between mute 20 and the inside of the end opening of exhaust duct 14 so as not to create a substantial back pressure in the exhaust pipe 13 from the boat engine, and the preferred flare at the output end 15 of exhaust duct 14 helps in providing an adequate exhaust area around mute 20. Mute 20 also cooperates with exhaust expansion region 23 so that exhaust gases cooled by expansion in region 23 are accelerated and relatively quietly output around mute 20 for substantial quieting of the exhaust, even if additional cooling by water injection is not used.

Mute 20 can be cast integrally with exhaust duct 14 or formed as a separately fabricated element secured in place in exhaust duct 14 in any of a variety of known ways, including bolts or brazing. The combination of mute 20 with a cooling water injection system results in a far quieter exhaust than has been practically possible with mufflers or other prior art expedients. Also, mute 20 cooperates with expansion area 23 as explained above for quietly outputing exhaust gases that are cooled by expansion in region 23. Mutes for the output end of a marine exhaust passageway can also have other configurations, especially when cooperating with the water injection cooling system of the invention for quieting a marine exhaust.

I claim:

1. A silencer for quieting the exhaust output from the output end of an exhaust passageway for a marine engine for a boat, said silencer comprising:
   a. the cross-sectional area of said exhaust passage way from said engine being substantially enlarged in a region immediately upstream of said output end for substantially expanding and cooling said exhaust gases just before said exhaust gases reach said output end;
   b. an inlet for receiving water from a body of water supporting said boat;
   c. means for injecting said water from said inlet directly into said enlarged region of said exhaust passageway; and
   d. means for dividing said injected water into particles and mixing said particles with exhaust gases in said enlarged region of said passageway for cooling and quieting said expanding exhaust gases from said engine before said exhaust gases are output along with said injected water from said output end of said passageway.

2. The silencer of claim 1 wherein said inlet is a scoop oriented to receive said water when said boat moves forward, and said injecting means is a line leading from said scoop to said enlarged region of said exhaust passageway so said water is forced by motion of said boat to move from said scoop into said passageway.

3. The silencer of claim 1 including a mute generally centered in said output end of said passageway, said mute having a maximum diameter less than the inside diameter of said output end of said exhaust passageway so said exhaust gases are output from said ouput end in an annular shaped flow extending around the periphery of said mute.

4. The silencer of claim 3 wherein said mute is generally conical with an apex extending into said output end of said passageway, and wherein said ouput end of said exhaust passageway is flared outward around said mute so said annular shaped flow has a larger diameter than said exhaust passageway.

5. A silencer for quieting the exhaust output from the output end of an exhaust passageway for a marine engine for a boat, said silencer comprising:
   a. the cross-sectional area of said exhaust passageway from said engine being substantially enlarged in a region immediately upstream of said output end for substantially expanding and cooling said exhaust gases just before said exhaust gases reach said output end;
   b. a mute generally centered in said output end of said exhaust passageway;
   c. said mute having a maximum diameter less than the inside diameter of said output end of said exhaust passageway so said exhaust gases are output from said output end in an annular shaped flow extending around the periphery of said mute; and
   d. said output end of said exhaust passageway being flared outward around said mute so said annular shaped flow has a larger diameter than said exhaust passageway.

6. The silencer of claim 5 wherein said mute is generally conical with an apex extending into said output end of said passageway and a maximum diameter region generally flush with said output end.

7. The silencer of claim 5 including an inlet for receiving water from a body of water supporting said boat, means for injecting said water from said inlet directly into said enlarged region of said exhaust passageway, and means for dividing said injected water into particles and mixing said particles with exhaust gases in said enlarged region of said passageway for cooling and quieting said exhaust from said engine before said exhaust is output from said output end of said passageway.

8. The silencer of claim 7 wherein said mute is generally conical with an apex extending into said output end of said passageway and a maximum diameter region generally flush with said output end.

* * * * *